Patented Oct. 9, 1923.

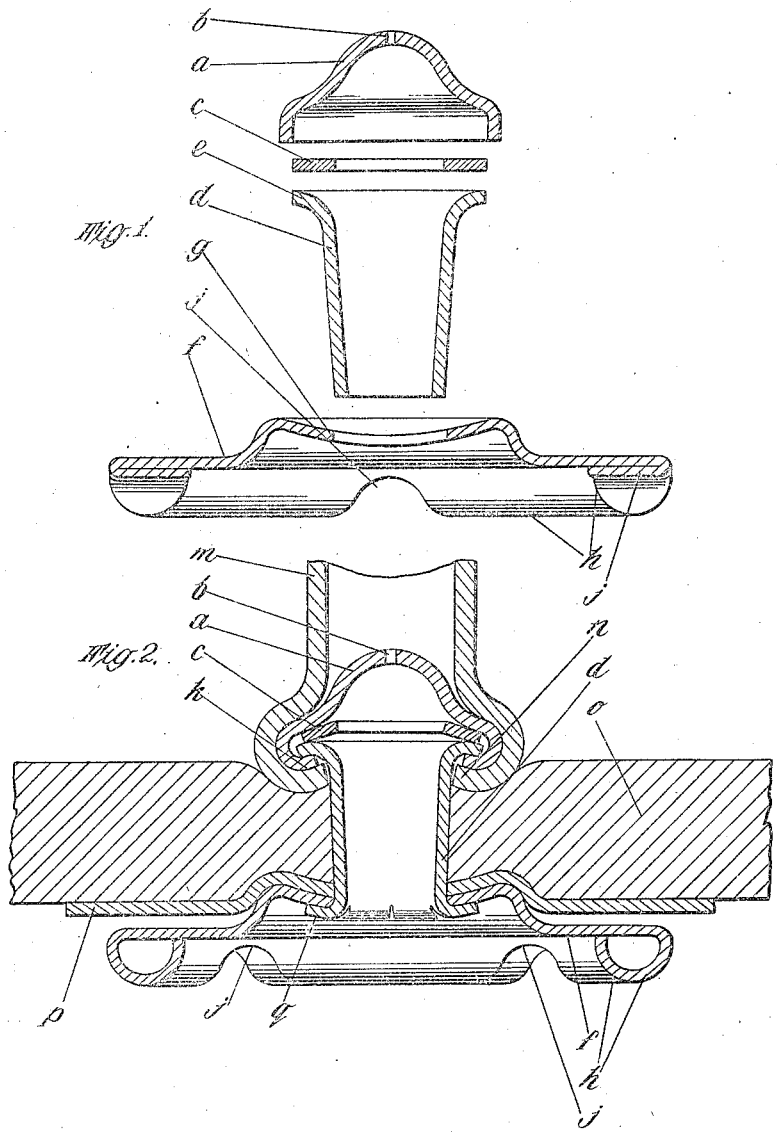

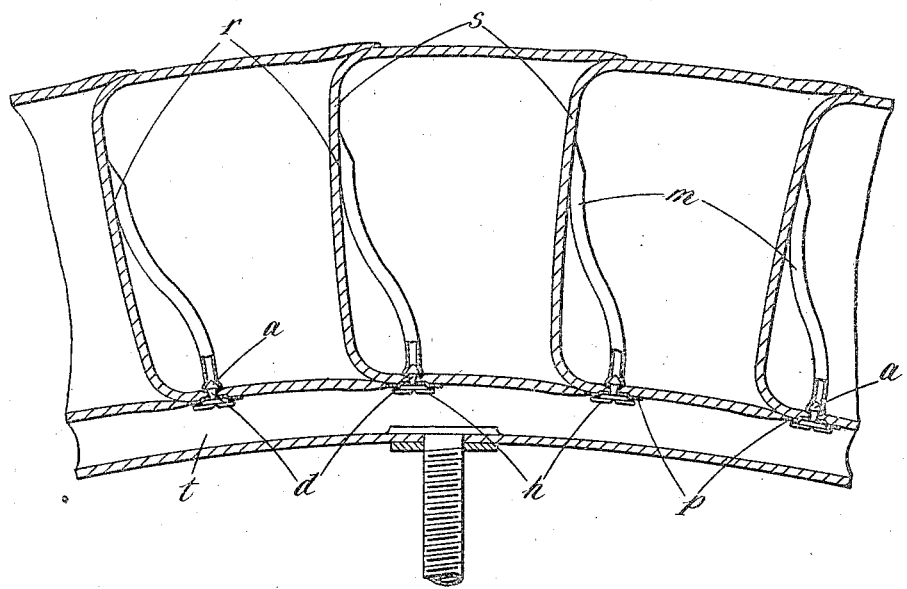

1,470,239

UNITED STATES PATENT OFFICE.

THOMAS BAKER McLEROTH, OF LONDON, ENGLAND, ASSIGNOR TO T. B. McLEROTH (TUBES) LIMITED, OF LONDON, ENGLAND.

AIR TUBE FOR PNEUMATIC TIRES.

Application filed February 9, 1923. Serial No. 617,930.

*To all whom it may concern:*

Be it known that I, THOMAS BAKER McLEROTH, formerly of Eastburn, The Crescent, Hadley Wood, in the county of Middlesex, and now of 56 Harley House, Regents Park, London, N. W. 1, England, a British subject, have invented certain new and useful Improvements in or Relating to Air Tubes for Pneumatic Tires, of which the following is a specification.

This invention relates to an air tube for a pneumatic tire, comprising a plurality of sections or compartments and a feed passage running around the inner periphery of the tube and communicating with each of the sections or compartments by way of a valveless rubber feed tube projecting into each section or compartment, the arrangement being such that the puncturing of one section or compartment will not affect materially the efficiency of the tire as a whole.

The object of the present invention is an improved form of so-called "stud" for introduction into a valveless rubber feed tube, and a further object of the invention is an improved method of building up the feed passage.

According to this invention the stud is constituted by two main portions, one, with a substantially axial passage therethrough and comprising a head and a neck, and the other, a base formed with a passage or passages arranged transversely thereof so as to communicate with the passage through the other portion and so as to debouch at or near the periphery of said base portion, said base portion being adapted to be secured to the neck of the other portion.

The head is preferably tapered and, in accordance with the improved method of building up the feed passage is forced into one end of a raw rubber valveless feed tube so that said end overlaps the junction of the head and neck, this tube is then partially vulcanized and that part which overlaps said junction contracts and underlies the head of the stud, the neck is then passed through a suitable aperture in a strip of raw rubber to which, preferably, a canvas patch has been previously applied, the aperture being formed through said patch. The neck is passed through the rubber from the side remote from the canvas patch until the underlying end of the partially-vulcanized feed tube is in contact with the raw rubber strip, the base portion is then placed in position relatively to said neck and the parts are secured together in such a manner as to grip the end of the partially-vulcanized feed tube and the strip of raw rubber between said head and said base portion, the canvas patch preventing stretching of the raw rubber strip around the aperture therethrough. When the required number of partially-vulcanized feed tubes and studs has been thus secured to the raw rubber strip the latter may be employed as one wall in the building up of the feed passage. If desired, however, the canvas patch may be applied directly to, and the stud may be passed through an aperture in, the wall of one section of the air tube itself.

The stud may be made from thin metal. For instance the head may comprise a tapered cup stamped from sheet metal with a fine aperture at its apex and with a thin washer or apertured strengthening disc forced into, or otherwise secured in, its open mouth, a length of metal tube constituting the neck being forced into, or otherwise secured in, the aperture in the washer or disc. If desired the cup may be compressed on, beaded to, or riveted over, the periphery of the disc or washer and the tube constituting the neck may be expanded in, beaded to, or riveted over said disc or washer, or it may be flanged out so as to be secured to the cup by beading the mouth of the cup over the flange of said neck. The base portion, which may also be stamped from sheet metal, may be formed as a circular disc or washer with a central aperture and with a marginal rib interrupted at any desired number of positions so as to provide the transverse passage or passages, the axial depth of the rib being such that, when the free end of the tube constituting the neck has been passed through the central aperture in the base portion and riveted over or otherwise secured so as to grip the end of the partially-vulcanized feed tube and the strip of raw rubber between the head and the base portion, the riveted over part will not project beyond the plane in which lies the summit of the marginal rib. The provision of a marginal rib of such axial depth ensures free communication between the tubular neck and the periphery of the base portion even when the latter bears against the opposed wall of the feed passage.

One form of the invention is illustrated in the accompanying drawings whereof Figure 1 is an axial section showing the components of the "stud," Figure 2 is a similar section on a plane at 45° to that on which Figure 1 is taken and showing the components of the "stud" assembled and the stud in position relatively to a valveless rubber feed tube and a rubber wall, whilst Figure 3 is a sectional elevation showing studs in position in the walls of the cups from which the air tube may be built up and showing the common feed passage.

As shown in Figure 1 the stud is made from thin metal components, the head comprising a tapered cup $a$ stamped from sheet metal with a fine aperture $b$ at its apex, and a strengthening disc $c$ adapted to fit within the head $a$. The neck comprises a tapered sleeve $d$ having a flared mouth $e$ at one end adapted to fit within the head $a$, whilst the base comprises a disc $f$ stamped from sheet metal with a central aperture $g$ adapted to fit over the tapered sleeve portion $d$ of the neck and with a recurved edge or beading $h$ pressed substantially flat at intervals to form transverse passages $j$ so that whilst the base as a whole is somewhat concavo-convex communication may be established with its concave side through the passages $j$ even though its beading $h$ may rest upon a flat surface.

The head of the stud is assembled and completed by placing the apertured disc $c$ into the tapered cup $a$, then the flared mouth $e$ of the neck and then beading or pressing inwards the marginal portion of the mouth of the cup $a$ as shown at $k$ in Figure 2. The head, so formed is then forced into one end of a raw rubber valveless feed tube $m$ so that said end overlaps the beading $k$, and the tube $m$ is then partially vulcanized. One result of this partial vulcanization is that that part of the tube $m$ which overlaps the beading $k$ contracts and underlies the head of the stud as shown at $n$ in Figure 2. The tapered sleeve part $d$ of the neck is then passed through a suitable aperture in a piece of raw rubber $o$, which may be a strip of raw rubber or the wall of one section of the air tube itself as hereinbefore set forth, until the underlying end $n$ of the partially-vulcanized feed tube $m$ is in contact with the piece of raw rubber $o$. In order to prevent stretching of the raw rubber $o$ where the aperture is formed therethrough to give passage to the tapered sleeve part $d$ of the neck, a patch $p$ of canvas is first applied to said piece of raw rubber $o$ and the aperture is punched through both concurrently, said tapered sleeve part $d$ being passed through from the side remote from the canvas patch $p$.

The base portion is then placed in position so that the aperture $g$ passes over the tapered sleeve portion $d$ of the neck, and the free end of the portion $d$ is then expanded, the head and base being simultaneously drawn together so as to grip therebetween the underlying end $n$ of the partially-vulcanized feed tube $m$, the piece of raw rubber $o$ and the canvas patch $p$. As shown in Figure 2 the end of the tapered neck portion $d$ of the neck is expanded as at $q$ in such manner that the part $q$ does not project beyond the plane in which lies the summit of the marginal beading $h$ of the base, that is to say when said beading rests upon a surface the part $q$ cannot contact with said surface, consequently there is always free communication through the passages $j$ with the neck, head, the aperture $b$ and the valveless rubber feed tube $m$.

The completion of the air tube is then effected as set forth in the specifications accompanying my applications for Letters Patent Serial Nos. 558,635, 623,392 and 623,393.

Figure 3 shows the improved studs in position in the walls of the cups from which the air tube may be built up, and it further shows how the free ends of the valveless rubber feed tubes $m$ may be attached by solution or otherwise suitably, as at $r$, to the centres of the adjacent diaphragms $s$ thus ensuring that when a section or compartment of the air tube is punctured and the diaphragms which constitute its end walls belly out, the free end of said valveless rubber feed tube $m$ will be located between those parts of the diaphragms which will come together first, consequently, said feed tube $m$ is squeezed as quickly as possible to seal off the common feed passage $t$ of the air tube.

If desired the base portion may be formed with radial passages therethrough leading to apertures in the tubular neck $d$. For instance the free end of the tubular neck $d$ may be cross-cut in axial planes intersecting at right angles and the base portion may consist of two sheet-metal plates each or one only of which may be stamped with a central aperture and with radial grooves leading to a circular groove at the inner margin, these plates being placed face to face (with the grooves opposed when both plates are grooved) and placed on the tubular neck $d$, those portions of said neck which lie between the cross cuts being then bent outwards and pressed against the adjacent plate. Even though the open end of the tubular neck $d$ may be closed by bearing against the opposed wall of the tubular strip or patch, the cross cuts in said neck will always communicate with the inner marginal groove of the base portion and thence by the radial grooves with the periphery of the base portion.

I claim:—

1. A stud for use in an air tube for pneumatic tires, of the kind hereinbefore set forth, constituted by two main portions, one, with a substantially axial passage therethrough and comprising a head and neck, and the other, a base formed with a passage or passages arranged transversely thereof so as to communicate with the passage through the other portion and so as to debouch at or near the periphery of said base portion, said base portion being adapted to secured to the neck of the other portion.

2. A stud, as claimed in claim 1 built up from a tapered cup, a tubular neck and a base portion having a passage or passages debouching at its periphery, substantially as set forth.

3. A stud, as claimed in claim 2, wherein an apertured strengthening disc and the flared mouth of the neck are disposed in the mouth of the tapered cup the marginal portion of which is then beaded over, substantially as set forth.

4. A stud as claimed in claim 2, whereof the base portion is substantially concavo-convex and wherein the free end of the neck portion having been passed through an aperture in said base is expanded thereover or otherwise secured thereto, substantially as set forth.

5. A stud, as claimed in claim 4 wherein the base portion is formed with a beaded or recurved edge flattened at angular intervals to form transverse passages, substantially as set forth.

6. The method of placing in position in an air tube of the kind hereinbefore set forth, a stud as claimed in claim 1 which consists in forcing the head of the stud into a raw rubber valveless feed tube so that the end overlaps the junction of the head and neck, partially vulcanizing said feed tube, inserting the neck of the stud through an aperture in a piece of raw rubber and then placing the base portion of the stud in position on, and securing it to, the neck portion, substantially as hereinbefore set forth.

Dated the sixteenth day of January, 1923.

THOMAS BAKER McLEROTH.